United States Patent
Karolitsky et al.

(10) Patent No.: US 11,520,891 B1
(45) Date of Patent: Dec. 6, 2022

(54) SECURE BOOT OF AN INTEGRATED CIRCUIT

(71) Applicant: Amazon Technologies, Inc., Seattle, WA (US)

(72) Inventors: Adi Karolitsky, Jerusalem (IL); Akram Baransi, Nazareth Illit (IL); Andrew Robert Sinton, Jerusalem (IL)

(73) Assignee: Amazon Technologies, Inc., Seattle, WA (US)

(*) Notice: Subject to any disclaimer, the term of this patent is extended or adjusted under 35 U.S.C. 154(b) by 283 days.

(21) Appl. No.: 16/710,487

(22) Filed: Dec. 11, 2019

(51) Int. Cl.
| | |
|---|---|
| *G06F 15/177* | (2006.01) |
| *G06F 9/00* | (2006.01) |
| *G06F 21/57* | (2013.01) |
| *H04L 9/32* | (2006.01) |
| *G06F 8/65* | (2018.01) |
| *H04L 9/08* | (2006.01) |

(52) U.S. Cl.
CPC .............. *G06F 21/575* (2013.01); *G06F 8/65* (2013.01); *G06F 21/572* (2013.01); *H04L 9/0891* (2013.01); *H04L 9/3247* (2013.01)

(58) Field of Classification Search
CPC .... G06F 21/575; G06F 21/572; G06F 9/4401; G06F 21/64; G06F 21/57; G06F 21/44; G06F 12/1408; G06F 11/1433
See application file for complete search history.

(56) References Cited

U.S. PATENT DOCUMENTS

| | | | | |
|---|---|---|---|---|
| 11,210,079 B2* | 12/2021 | Fassino | ............... | H04L 63/0823 |
| 2013/0124845 A1* | 5/2013 | Wang | .................... | G06F 21/554 |
| | | | | 713/2 |
| 2015/0134970 A1* | 5/2015 | Jang | ...................... | H04L 9/3247 |
| | | | | 713/176 |
| 2015/0215126 A1* | 7/2015 | Ashdown | .............. | H04L 9/3247 |
| | | | | 713/171 |
| 2015/0261521 A1* | 9/2015 | Choi | ....................... | H04L 63/12 |
| | | | | 713/176 |
| 2018/0129809 A1* | 5/2018 | Zhang | ....................... | H04L 9/14 |
| 2019/0042752 A1* | 2/2019 | Mihm | ................... | G06F 9/4401 |
| 2020/0028737 A1* | 1/2020 | Liu | ....................... | H04L 9/3247 |

FOREIGN PATENT DOCUMENTS

CN 109840104 A * 6/2019 ........... H04L 9/0891

OTHER PUBLICATIONS

English Translation of CN 109840104-A (Year: 2019).*

* cited by examiner

*Primary Examiner* — Xuxing Chen
(74) *Attorney, Agent, or Firm* — Klarquist Sparkman, LLP

(57) ABSTRACT

A computer chip, such as an System on chip (SOC), can receive firmware updates having two separate signatures; a first of the signatures is used to authenticate the firmware using a processor within the computer chip, and a second of the signatures is used by a controller, separate from the processor. A first key, used by the processor to authenticate the firmware, can be a boot key that is hardwired in the computer chip. A second key, used by the controller, can be a key that is provided to the controller at any time and is updatable. The controller can suspend the processor so that the controller can perform a first authentication of the firmware using the second signature and the second key. If the authentication is successful, the controller can release the processor, which then uses the first key and the first signature to perform a second authentication.

18 Claims, 10 Drawing Sheets

SECURE BOOT OF AN INTEGRATED CIRCUIT

BACKGROUND

Booting of a computer occurs when the computer is started, and is initiated by a power event, or a software command. After being switched on, a central processing unit can read non-volatile memory and perform a first-stage bootloader, which can setup memory, reset a disk system and read a second-stage bootloader into memory. The second stage bootloader can read a kernel image into memory, setup descriptor tables, and transfer control to the kernel code. Authenticating the second-stage bootloader can be performed using a signature of the second stage firmware and a key stored in fuses of the computer. However, security issues can cause the key to be compromised, and updates of the key are difficult because there are a limited number of fuses available in hardware.

DETAILED DESCRIPTION

Hardware that has an authentication key burned (i.e., fixed) into silicon can have reduced security if the key is compromised. The described system reduces the need of complex hardware and/or BootROM code to support keychain operations. Moreover, the system allows a secondary boot image (hereinafter called a "stage 2" image) to be verified using the fixed boot key while maintaining rollback protection. A bad actor that gains access to the fixed boot key is not able to update the stage 2 image because of a hardware lock-down mechanism. The secure boot of an embedded CPU firmware is protected by using an updated loadable boot image (stage 2) with updated keys used to authenticate the updated boot image. The fixed boot key is still used and can remain unchanged. A lock-down of hardware can occur to verify the stage 2 image without the knowledge of the BootROM. The system allows a stage 2 firmware update to have two separate digital signatures and to be authenticated using a separate update key and boot key. Updated stage 2 firmware is authenticated using the latest update key but is further verified using the boot key. A lock-down mode adds another layer of security and is performed by a separate entity, such as a micro-controller. Thus, the overall security and flexibility of the firmware-upgrade process, and of the system itself, is improved.

A computer chip, such as a microprocessor, System on chip (SOC), or other Integrated Circuit (IC), can receive firmware updates having two separate signatures: a first of the signatures is used to authenticate the firmware using a processor within the computer chip, and a second of the signatures is used by a controller, separate from the processor, to authenticate the same firmware. A first key, used by the processor to authenticate the firmware, can be a boot key that is hardwired in the computer chip. A second key, used by the controller, can be a key that is provided to the controller at any time and is updatable. The controller can suspend (i.e., lock down) the processor so that the controller can perform a first authentication of the firmware using the second signature and the second key. If the authentication is successful, the controller can release the processor, which then uses the first key and the first signature to perform a second authentication.

In any of the examples described herein, firmware comprises one or more software components that provide control and/or monitoring of one or more components of an electronic device. In at least some embodiments, the firmware comprises executable instructions stored in a non-volatile storage location (such as a non-volatile random-access memory (NVRAM), an electronically erasable programmable read-only memory (EEPROM), a persistent storage medium, or the like). The firmware can be accessed by a processor, such as a processor and microcontroller during a boot process of the device. The firmware is not fixed and can be updated in non-volatile memory.

Figure 1:
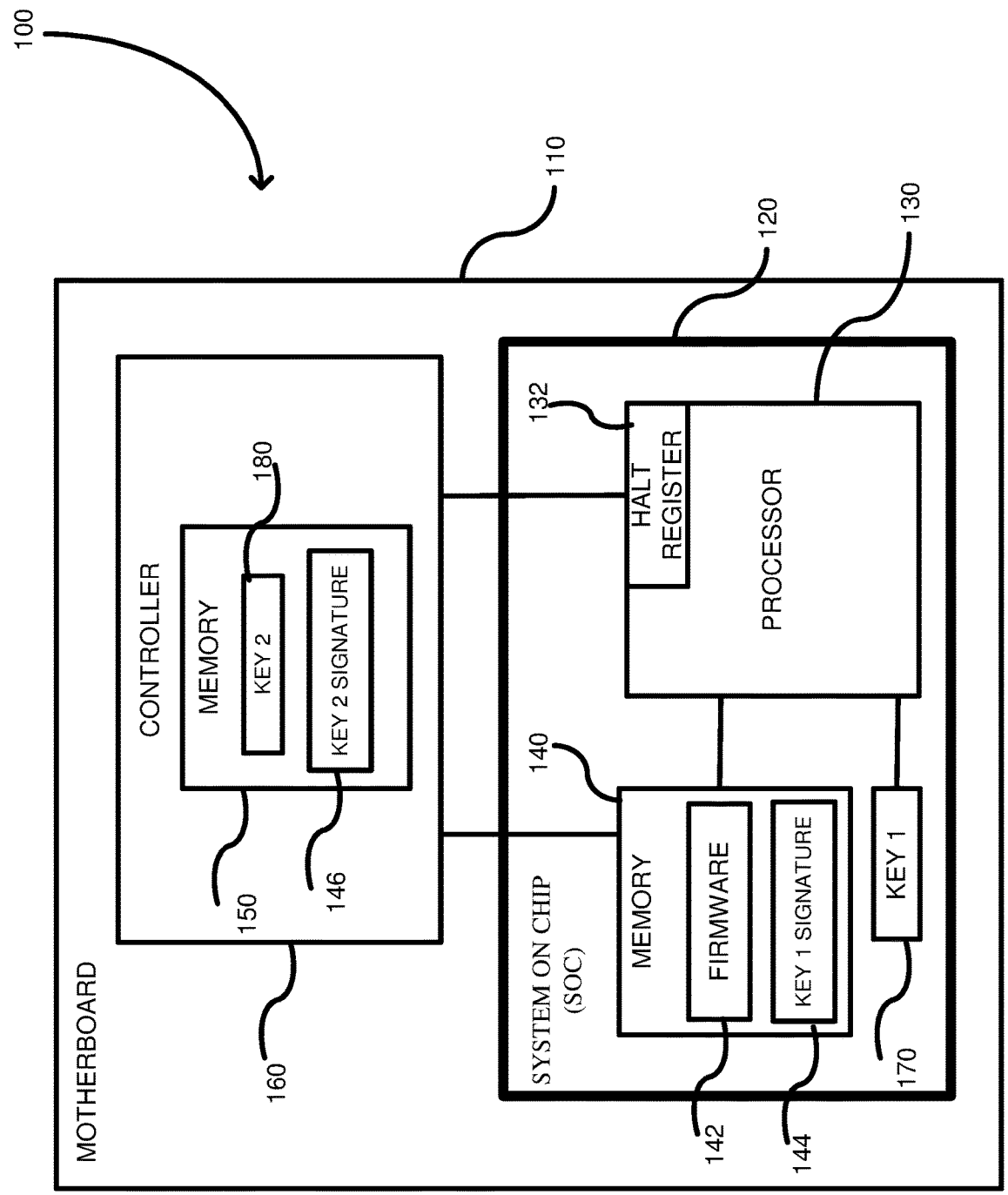
FIG. 1 is a system diagram according to one embodiment for booting a System on Chip (SOC) using two separate keys, one of which is authenticated using a separate controller.

FIG. 1 is a system 100 including a motherboard 110. The motherboard 110 is a printed circuit board (PCB) that can be a main circuit board in a computer through which components and peripherals connect. Alternatively, the system 100 can be implemented using a circuit board besides a motherboard; for example, the other components of system 100 could be on a circuit board that is part of an expansion card. The motherboard includes a system on chip (SOC) 120. Although the SOC 120 generally includes multiple components, only components needed for a boot mechanism are displayed in FIG. 1. The SOC 120 includes a processor 130 that includes a halt register 132. The halt register 132 can be used to stop the processor 130 from executing further instructions and can be used to lock-down the processor 130. The processor 130 is shown as a single processor but can include one or more processors, microprocessors, field-programmable gate arrays (FPGAs) or other suitable processing logic. The processor 130 is generally capable of executing software code and can include multiple processing cores. The motherboard 110 also includes a memory 140. The memory 140 can be any of a variety of non-volatile memory types, such as flash memory, or electrically erasable programmable read only memory (EEPROM). The memory 140 is used to store firmware 142 for the SOC 120. The firmware 142 can be associated with two different signatures, a key 1 signature 144 and a key 2 signature 146. The key 1 signature is shown stored in the local memory 140, while the key 2 signature 146 is shown within a separate memory 150 of a controller 160. The memory 150 can be any of a variety of types including Dynamic Random-Access Memory (DRAM), Synchronous DRAM (SDRAM), Double Data Rate (DDR), or any types of non-volatile memory described above. The controller 160 can be a micro-controller, FPGA, processor or other suitable processing logic. Although the controller 160 is shown as separated from the SOC 120 and coupled thereto, it can be integrated therein. The key 2 signature 146 can be received at a same time as the firmware 142 and sent to the controller 160 by the SOC 120 or can be received at a different point in time from a separate server. There are a variety of techniques that can be used to deliver the key 2 signature 146 to the controller 160, depending on the design.

Two separate keys 170, 180 are used to authenticate the firmware 142. The first key 170, called key 1, is a boot key and is typically burned into the SOC 120 so that it cannot be altered, although it can also be in any trusted storage of the SOC 120, such as EEPROM, a smart card, flash memory, a trusted platform module (TPM), etc. The second key 180, called key 2, is an updatable key that can be received at any point, such as from a central server computer, which provides the stage 2 firmware 142. Stage 1 software (not shown) can be executed and can authenticate the stage 2 firmware 142 by using the key 1 signature 144 and the key 1 170. The firmware 142 can be further authenticated by the controller 160 using the key 2 signature 146 and the key 2 180. In order to ensure the controller 160 can verify the firmware 142, the controller 160 uses a halt register 132 that halts the processor 130 during booting. While the processor 130 is halted, the controller 160 can be the only entity that has access to the memory 140 and has control of the system 100. Once the controller 160 authenticates the firmware 142 using the key 2 180, it unhalts the processor 130. The processor 130 can then further authenticate the firmware 142 using the key 1 signature 144 and the key 1 170. The timing can be such that the authentication by the processor 130 occurs after the authentication by the controller 160. In some embodiments, it is desirable that authentication by the processor 130 occurs directly after authentication by the controller 160 to ensure security is maintained. Thus, using two separate signatures 144, 146 and two separate keys 170, 180 for authentication of the firmware 142 allows increased security and allows at least one of the keys 180 to be updated at a high frequency. It should be noted that symmetric or asymmetric encryption can be used in generating the signatures 144, 146. In symmetric encryption, the same keys 170, 180 are used to generate the signatures 144, 146 and to authenticate the firmware. In asymmetric encryption, the keys 170, 180 can be public keys. A combination of symmetric and asymmetric can also be used, such that one of the authentications uses symmetric and the other uses asymmetric encryption.

Figure 2:
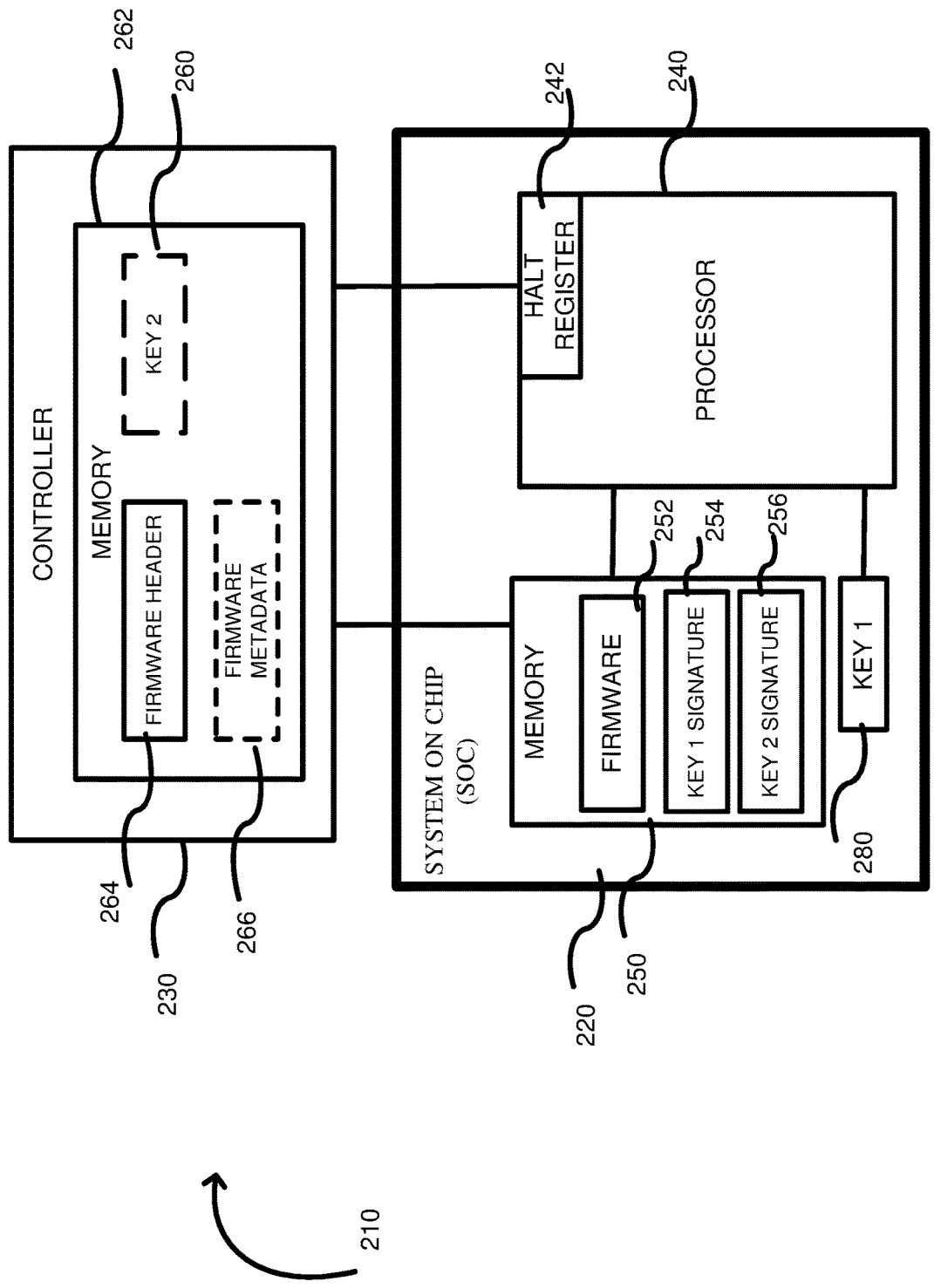
FIG. 2 is a system diagram illustrating that a fast authentication can be performed using a memory compare of a firmware header and other metadata.

FIG. 2 shows another embodiment of a system 210 wherein a different authentication technique can be used as a fast authentication. The system 210 includes an SOC 220 and a controller 230, which can be integrated into the SOC 220 or separated therefrom, as illustrated. The SOC 220 includes a processor 240 having a halt register 242 coupled to the controller 230. The SOC 220 further includes a memory 250 storing firmware 252 and two signatures 254, 256 associated with the firmware 252. The signatures 254, 256 can be received at a same time as the firmware 252 or at a different time. In one example, the signatures 254, 256 can be received as part of the firmware image 252. Additionally, the signatures 254, 256 can be received in a same file as the firmware 252 or in different files. At a first point in time, the controller 230 authenticated the firmware 252 using a key 2 260 stored in a memory 262. At that time, the controller 230 stored a portion of the firmware 252 in the memory 262, such as the firmware header 264 and/or other metadata 266, such as a version number, etc. To perform a fast authentication on a future reboot, the controller 230 can perform a memory compare between the header 264 stored locally at the controller with the firmware header associated with the firmware 252. The firmware metadata can also be used in the compare and is shown optionally in dashed lines. Likewise, the key 2 260 can be used to further authenticate the firmware 252 but is shown in dashed lines as optional as such an authentication is more time consuming and was already performed at an earlier time.

Thus, in operation, after a reboot, the controller 230 can set the halt register 242 to halt the processor 240. The controller can then read the firmware 252 from the memory 250 and compare any desired portion of the firmware to a previously stored portion, such as the firmware header 264 and/or additional metadata 266. If there is a match between the two, then the controller 230 can release the halt register 242 (i.e., unhalt the halt register), and allow the processor 240 to further authenticate the firmware 252 using the key 1 signature 254 and the stored key 1 280. Once authenticated by both the processor 240 and the controller 230, the firmware can be executed by the processor 240. If the authentication fails, such as the controller authentication fails, the controller 230 can retain the processor in the halted state using the halt register 242, and any desired corrective action can be taken, such as by transmitting a message to a system administrator.

Figure 3:
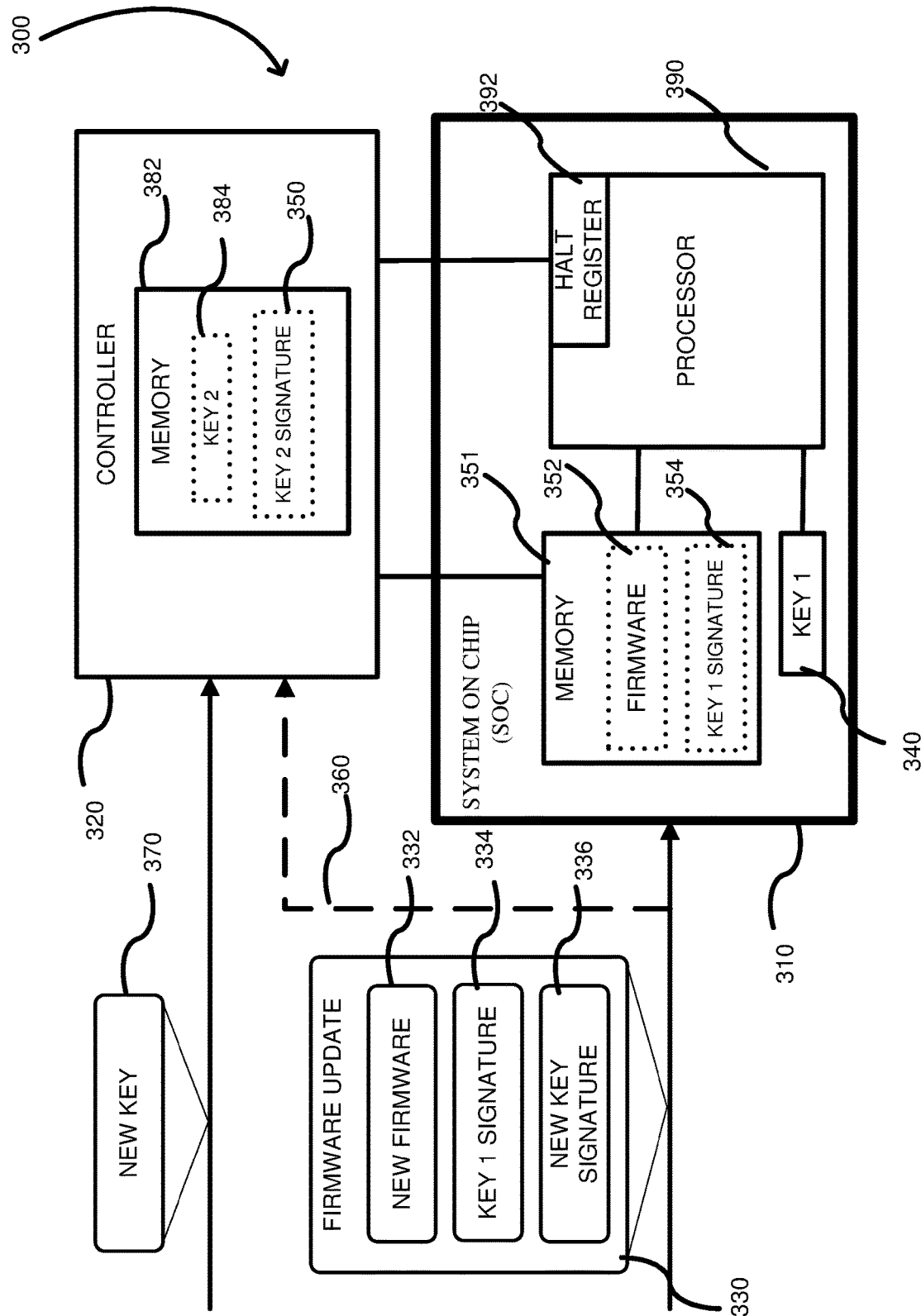
FIG. 3 is a detailed system diagram showing an updated key being received by the separate controller for performing the authentication.

FIG. 3 is another embodiment of a system 300 including an SOC 310 and a separate controller 320. In this embodiment, a firmware update 330 is shown as being received and including new firmware 332, a first signature 334 associated with a key 1 340, and a second signature 336 associated with a key 2. The signature 336 is a signature associated with a new key 370. The new key 370 replaces a previous key 384 and the new signature 336 replaces a previous signature 350. There are a variety of techniques for splitting the firmware update 330 so that new key signature 336 is stored in the controller 320 in place of the old signature, the new firmware 332 is stored in the memory 351 replacing old firmware 352, and the key 1 signature 334 is stored in the memory replacing the old key 1 signature 354. One technique is that the SOC 310 receives the firmware update 330 and splits it into the different components and transmits the new key signature 336 to the controller 320. Another technique, shown by dashed line 360, is that both the controller 320 and the SOC 310 receive the firmware update 330 and each parses its respective parts and stores in their respective memories. As shown at 370, a new, updated key 370 can be received by the controller 320 and is stored in a memory 382 as replacing the old key. A processor 390 and halt register 392 are like the discussion above and are not discussed further for purposes of brevity. Thus, firmware updates can receive a new signature 336 and a new key 370, while the old key 340 can remain unchanged.

Figure 4:
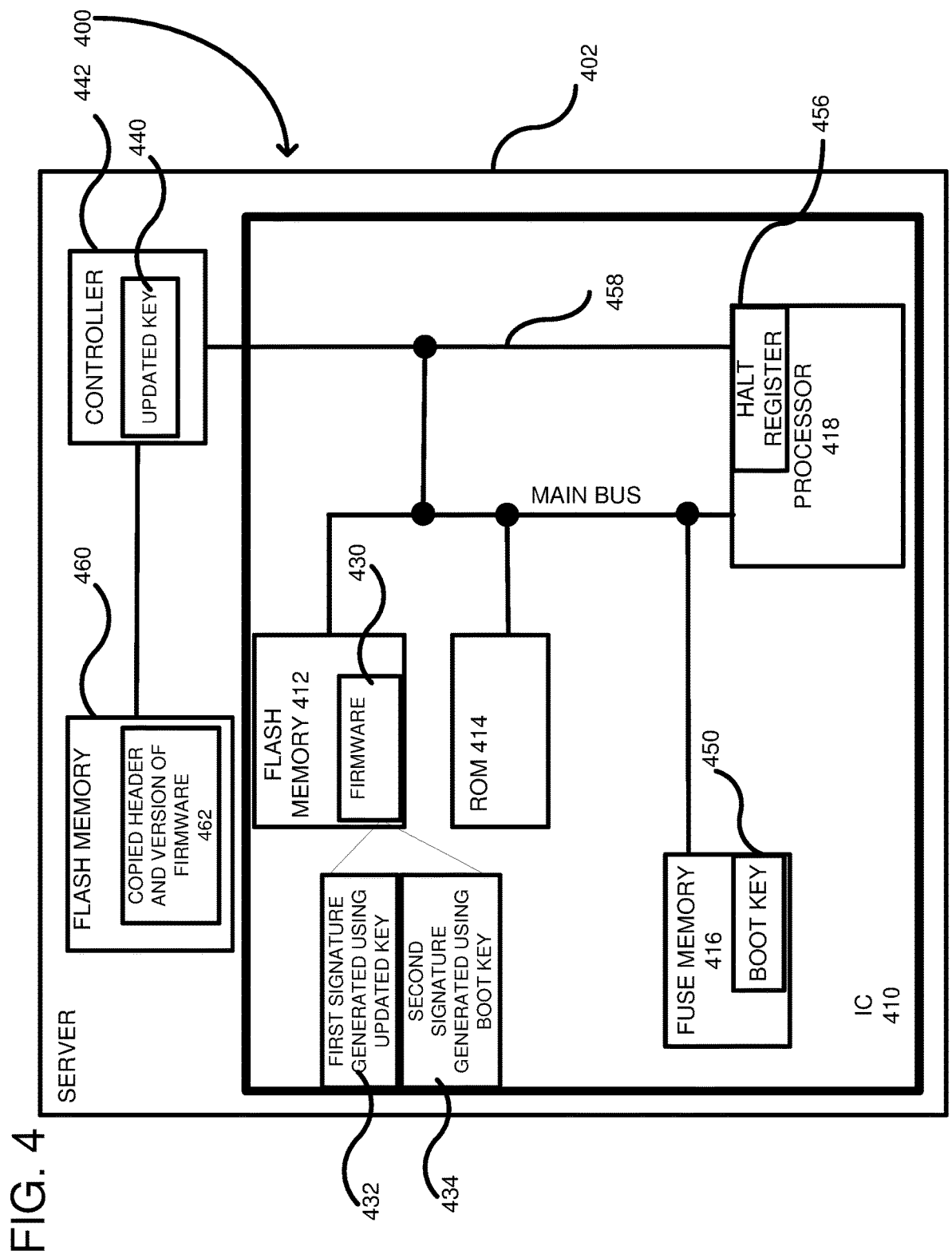
FIG. 4 is a detailed system diagram of a server computer including an SOC and a separate controller used to authenticate firmware within the SOC.

FIG. 4 is an example system 400 according to another embodiment of a server computer 402. An Integrated Circuit (IC) 410, which can be a SOC, for example, includes flash memory 412, a Read Only Memory (ROM) 414, a fuse memory 416, and a processor 418. The ROM 414 can store initial boot code that is used to perform the authentication of stage 2 firmware 430 stored in the flash memory 412. The firmware can have 2 signatures associated therewith, including a first signature 432 and a second signature 434. The first signature 432 can be used in cooperation with a key 440, stored in a controller 442, to authenticate the firmware 430. Such an authentication of the firmware 430 occurs using the controller 442. The first signature 432 can be generated using the key 440 if symmetric encryption is used. The second signature 434 can be generated using a boot key 450 stored in the fuse memory 416. Generation of the first and second signatures 432, 434 occurs at a deployment server (not shown in FIG. 4) described below in relation to FIG. 5. The controller 442 is coupled to a halt register 456 in the processor 418 using a bus 458. The controller 442 can further be coupled to a flash memory 460, which can store a copied header and version number (see 462) of the firmware 430 to allow a fast authentication through a memory compare. Although shown in a server computer, the controller and IC can be within a device other than a server computer, such as a router, switch or other communication equipment.

Figure 5:
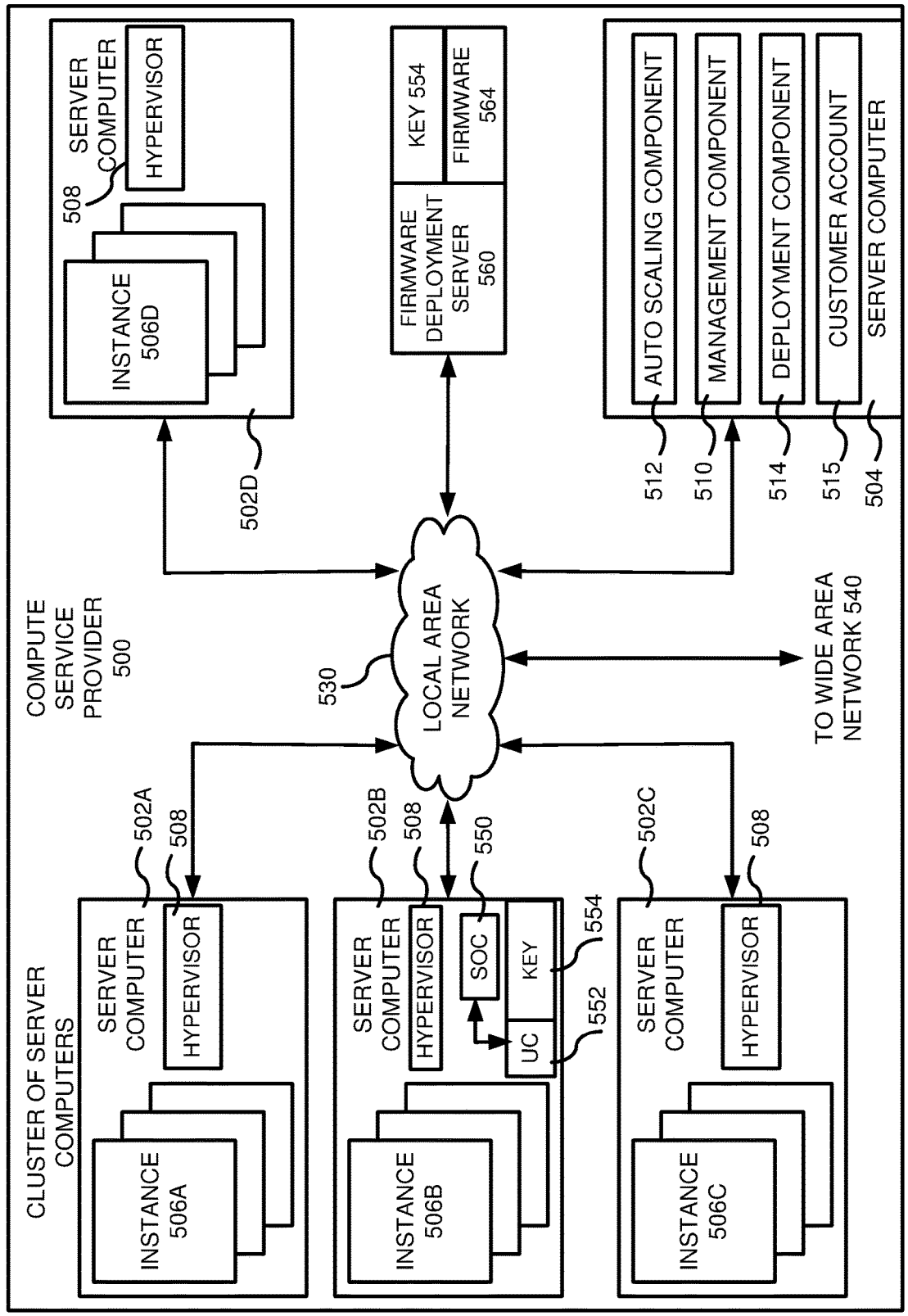
FIG. 5 is an example system diagram showing a plurality of virtual machine instances running in the multi-tenant environment with a firmware deployment server that transmits updated firmware with an updated key.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The illustrated compute service provider 500 includes a plurality of server computers 502A-502D. While only four server computers are shown, any number can be used, and large centers can include thousands of server computers. The server computers 502A-402D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. Server computer 502B is shown having an SOC 550 coupled to a microcontroller 552 that stores an updatable key 554. The key 554 is received from a deployment server 560 that generates the key 554 before passing it to the microcontroller 552. The deployment server 560 deploys firmware 564 to the SOC 550 and deploys the updatable key 554 to be used in authenticating the firmware, as described above. The firmware can have two signatures associated therewith, one of which is used to authenticate the firmware 564 by the microcontroller 552 and the other signature used by the SOC in association with a hard-wired key (not shown) to authenticate the firmware.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

Although the SOC 550, micro-controller 552, and key 554 are shown on only a single server computer, 502B, it is understood that similar hardware can be positioned on the other illustrated server computers.

Figure 6:
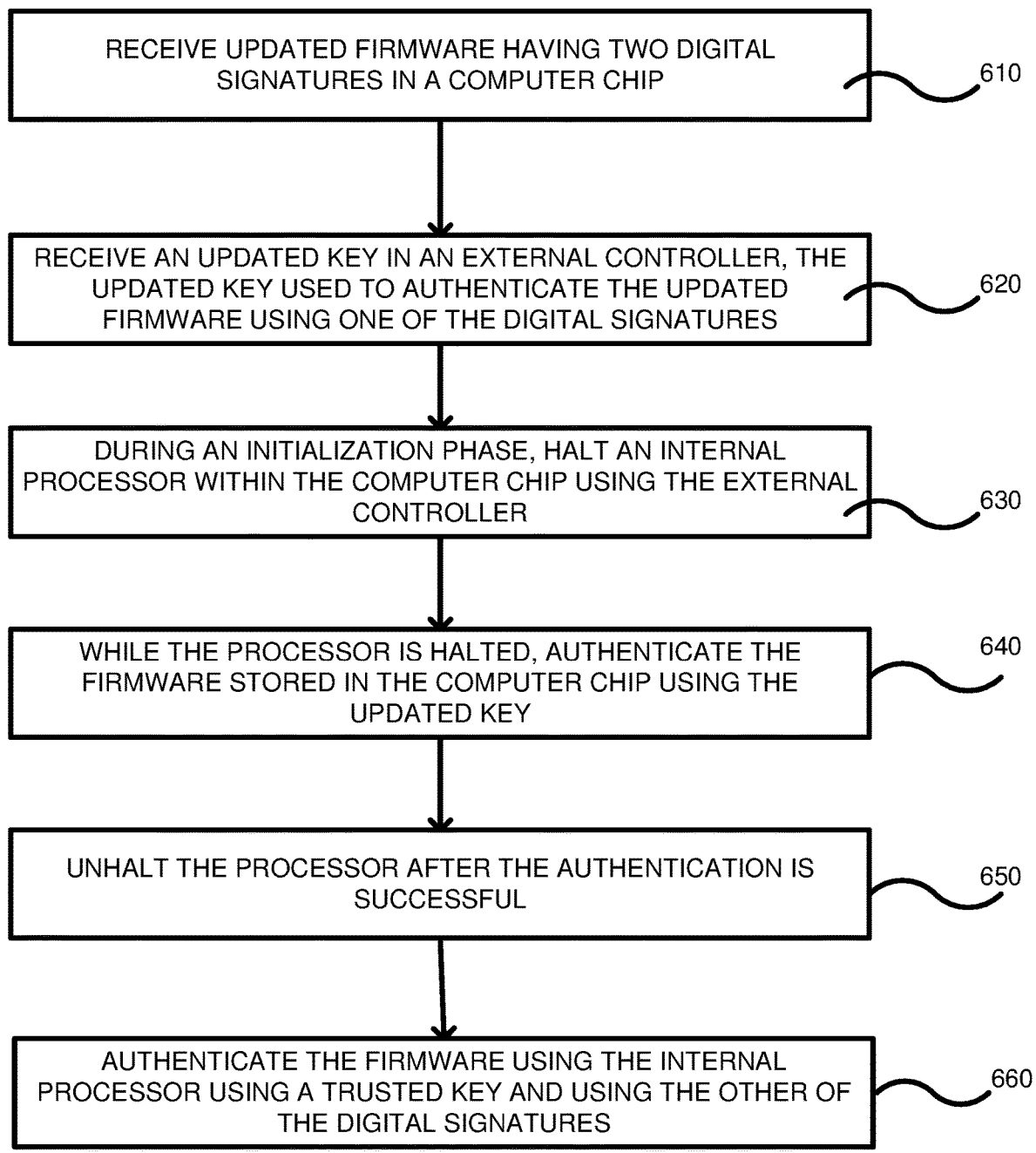
FIG. 6 is a flowchart according to one embodiment for authenticating firmware in a computer chip.

FIG. 6 is a flowchart according to one embodiment of a method for updating firmware in a computer chip, such as an SOC or other Integrated Circuit. In process block 610, updated firmware is received in the computer chip, the updated firmware having two digital signatures. For example, in FIG. 3, the firmware update 330 includes signatures 334 and 336. In process block 620, an updated key is received in an external controller. For example, in FIG. 3, the updated key 370 is received and stored (replacing key 384) in the controller 382. The updated key 370 can be generated at anytime by the firmware deployment server 560 (FIG. 5) and new updated keys can be generated with new versions of firmware 564. In process block 630, during an initialization phase, an internal processor within the computer chip is halted using the external controller. For example, the initialization phase can be during a startup of the IC 410 (FIG. 4) and the controller 442. Once the initialization phase commences, the processor 418 starts to run code from ROM 414. However, the controller 442 sets the halt register 456 to suspend processor 418 operations. Other techniques for halting the processor 418 can be used, and the selected technique is based upon the particular processor. For example, setting an external pin, such as a general-purpose pin, can suspend the processor in some designs. In process block 640, while the processor is halted, the firmware is authenticated using the updated key. For example, in FIG. 4, the controller 442 can use the key 440 to authenticate the firmware using the first signature 432. In process block 650, assuming the controller 442 authenticates the firmware successfully, it unhalts the processor 418 by resetting the register 456. In process block 660, the processor then proceeds to authenticate the firmware using a trusted key, such as a fused key. For example, processor 418 can continue to authenticate the firmware 430 by using the signature 434 and the boot key 450. Thus, the firmware 430 has two separate authentications performed by different controllers/processors using different signatures and different keys.

Figure 7:
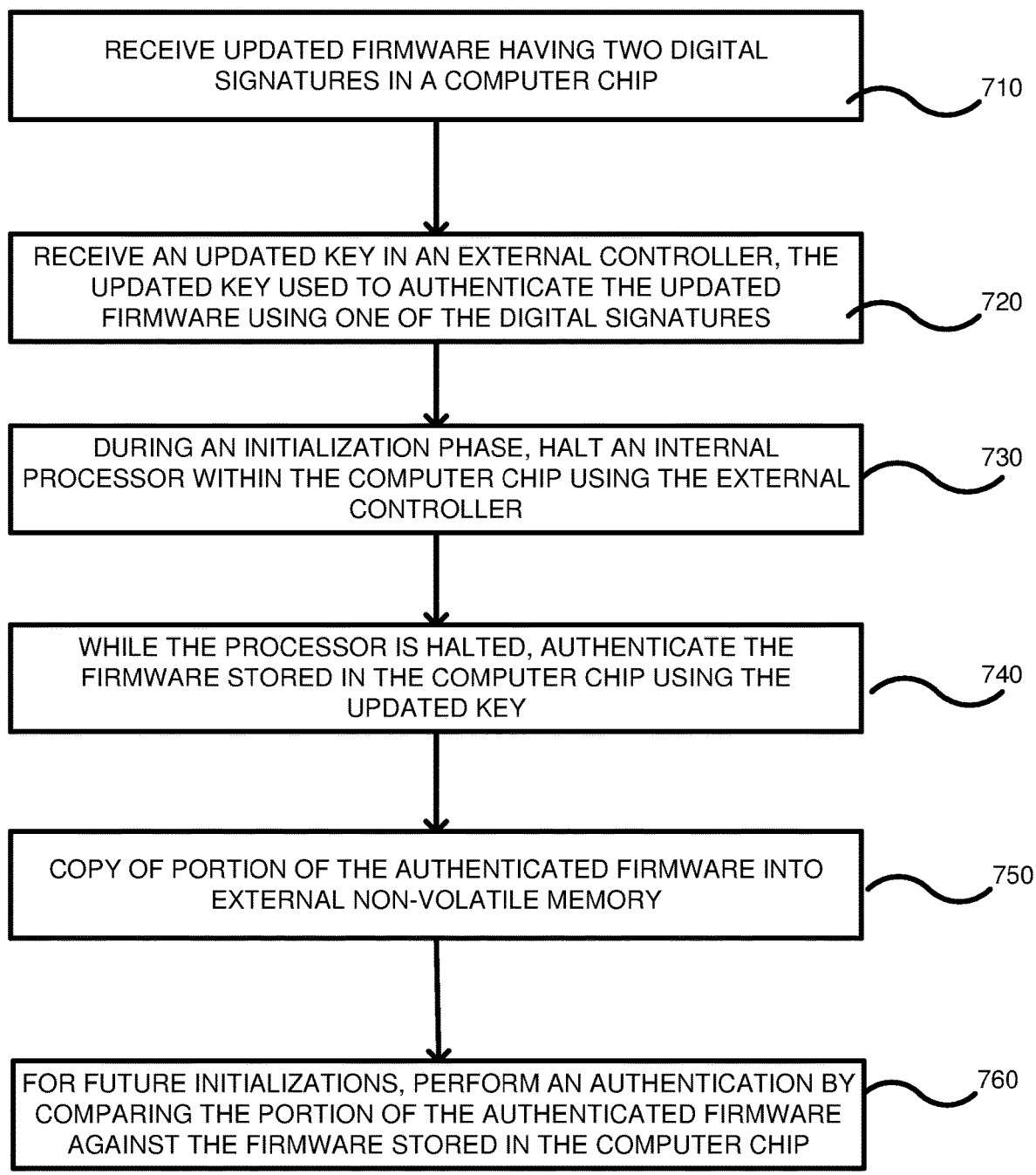
FIG. 7 is a flowchart according to another embodiment for authenticating firmware in a computer chip.

FIG. 7 shows a flowchart according to another embodiment of a method for authenticating and updating firmware in a computer chip, such as an SOC or other Integrated Circuit. In process block 710, updated firmware is received having two digital signatures. For example, in FIG. 2, the firmware update 252 includes digital signatures 254, 256. In process block 720, an updated key is received in an external controller, wherein the updated key can be used to authenticate the firmware using one of the digital signatures. For example, in FIG. 2, the key 260 can be received in the controller 230, such as from a deployment server 560. In process block 730, a processor can be halted by an external controller. For example, in FIG. 2, the controller 230 can halt the processor 240 using the halt register 242. In process block 740, while the processor is halted, the controller 230 can authenticate the firmware using the updated key 260 and the associated signature 256. Assuming the firmware is authenticated, in process block 750, a copy of a portion of the authenticated firmware is copied into an external non-volatile memory. For example, in FIG. 2, the portion of the firmware is the firmware header 264. Other portions than the header can be used instead, or additional metadata can be used, as shown at 266. In process block 760, for future initializations that occur without further firmware updates, an authentication can be performed by comparing the saved portion of the firmware to the firmware stored in the computer chip. For example, in FIG. 2, the controller 230 can authenticate by comparing the firmware header 264 to the header of firmware 252 using a simple memory compare. If they match, then the firmware can be considered authenticated by the controller 230. Authentication by the processor can then occur after the controller 230 unhalts the processor 240. Authentication can further be checked using other metadata 266 or even using the key 260 for a detailed authentication. The simple memory compare performed on already previously authenticated firmware is a fast authentication technique that can be used to avoid using a key and signature authentication, which is more time consuming.

Figure 8:
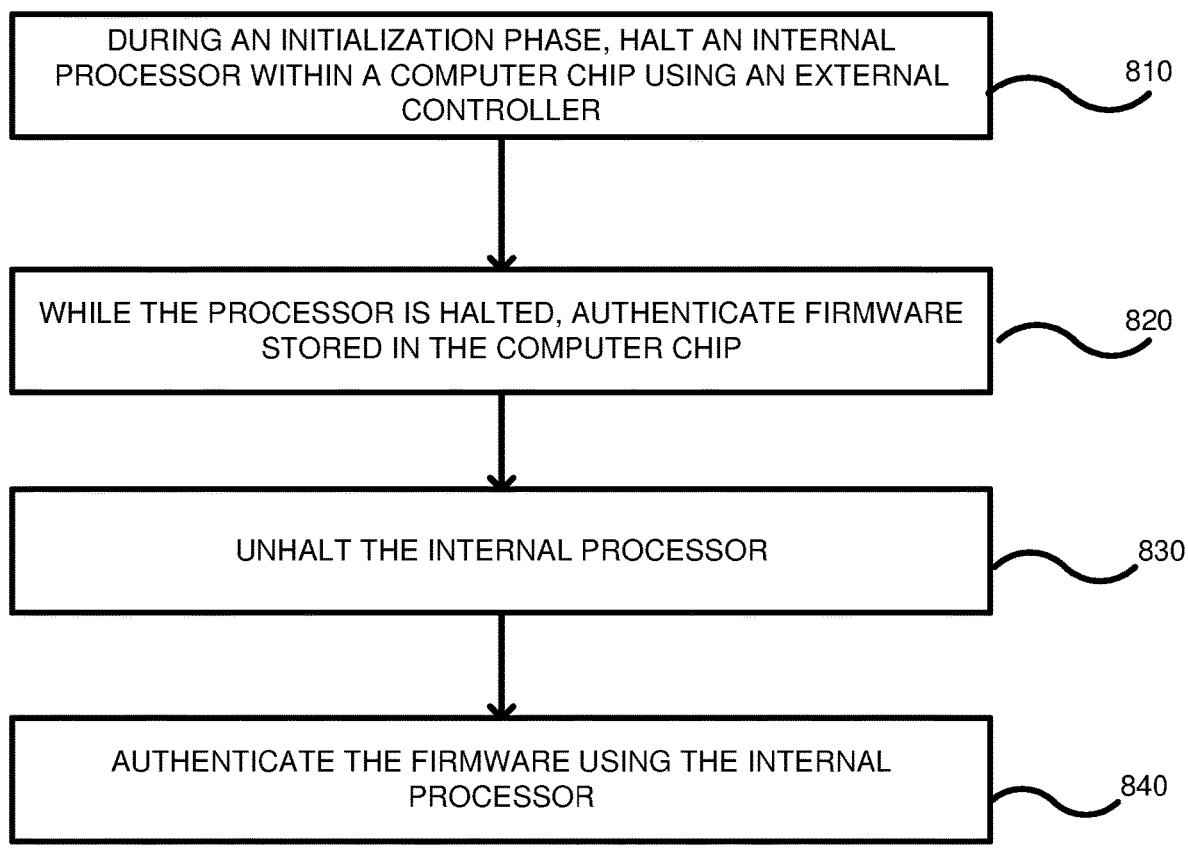
FIG. 8 is a flowchart according to yet another embodiment for authenticating firmware.

FIG. 8 is a flowchart according to another embodiment of a method for updating firmware in a computer chip, such as an SOC or other Integrated Circuit. In process block 810, during an initialization phase, an internal processor within a computer chip is halted, such as by using an external controller. For example, the controller 442 (FIG. 4) can be used to halt the processor 418 within the IC 410. In process block 820, while the processor is halted, firmware in the computer chip is authenticated. Thus, the controller 442 can authenticate the firmware 430 using the key 440 or the stored portion of the firmware 462. In process block 830, the processor is unhalted. For example, processor 418 can be unhalted so that it can resume its booting sequence. Then in process block 840, the internal processor authenticates the firmware. For example, processor 418 can authenticate the firmware 430. Thus, two separate authentications occur to increase security.

Figure 9:
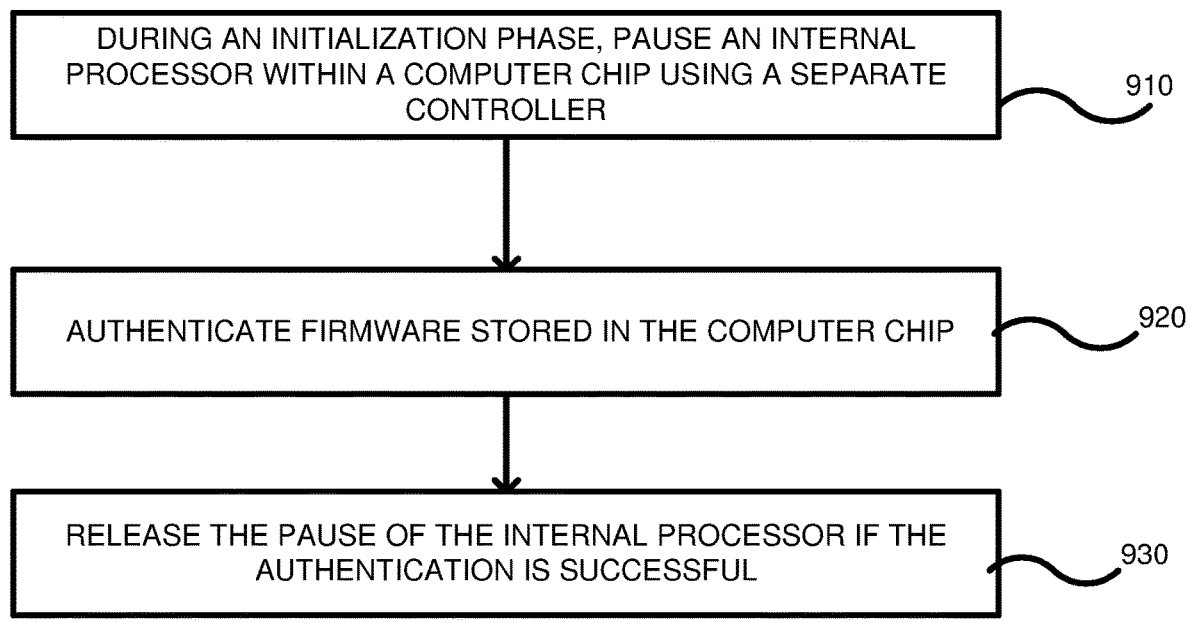
FIG. 9 is a flowchart according to still another embodiment for authenticating firmware.

FIG. 9 is a flowchart according to another embodiment of a method for updating firmware in a computer chip, such as an SOC or other Integrated Circuit. In process block 910, during an initialization phase (e.g., after a hard or soft restart), an internal processor within a computer chip is paused using a separate controller. For example, in FIG. 1, the controller 160 can halt the processor 130 such that it suspends executing software instructions. In process block 920, firmware is authenticated that is stored in the computer chip. Thus, even though the processor 130 is suspended, the firmware 142 is authenticated using a separate controller 160. In process block 930, the pause of the processor is released if the authentication is successful. Thus, the controller 160 can release the processor 130 so that it can continue executing software and perform its boot operation.

Figure 10:
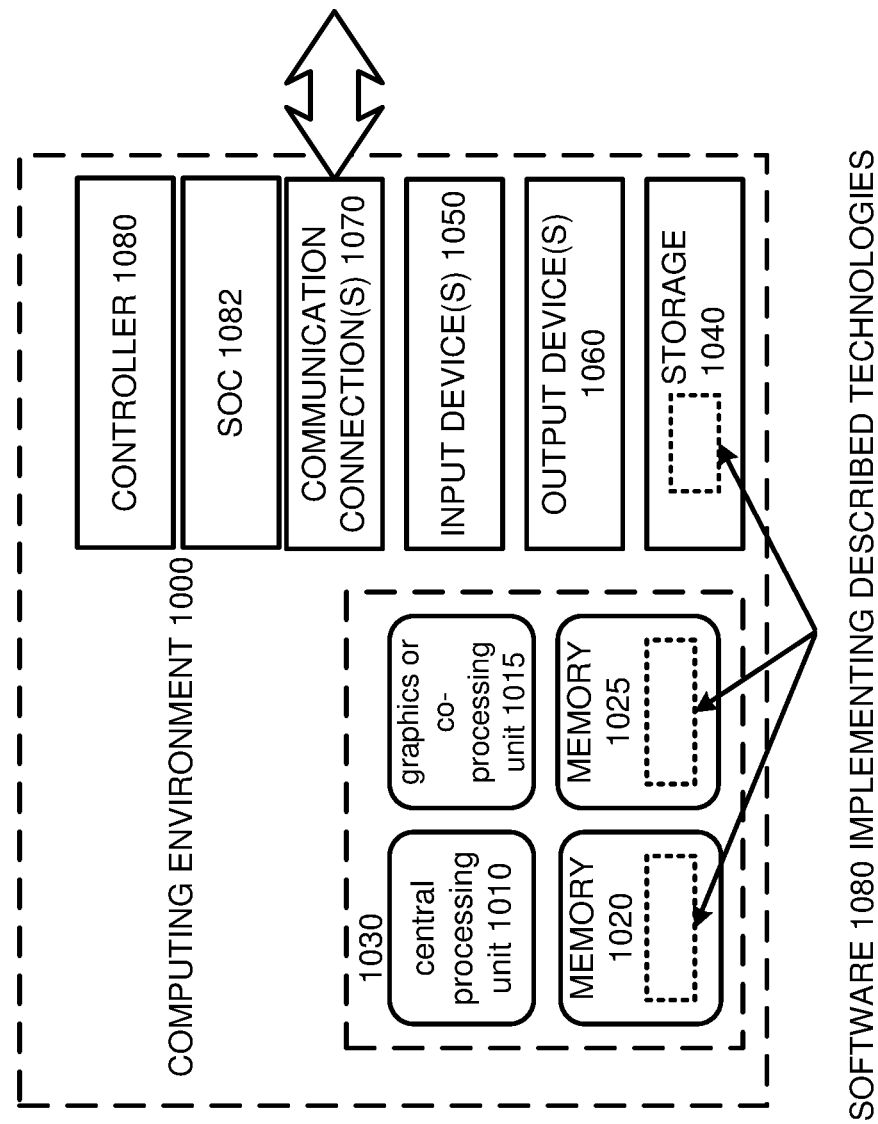
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

An SOC 1082 can include an internal processor, memory, and perform an internal boot operation, separate from a boot process carried out on central processing unit 1010. A controller 1080 can be coupled to the SOC 1082 and can control the boot operation of the SOC 1082 by suspending the SOC's processor after restarting (through a soft or hard reboot). The controller 1080 can then authenticate firmware within the SOC while the SOC is suspended and can release the SOC once the authentication is verified. If the controller 1080 determines that authentication failed, then the controller 1080 can keep the SOC suspended and take corrective action, such as transmitting a message over the communication channel 1070 alerting an administrator. Otherwise, if authentication passed, the SOC 1082 is released to continue its boot operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of updating firmware of a computer chip, the method comprising:
   during an initialization phase of the computer chip, halting an internal processor within the computer chip using an external controller coupled to the computer chip;
   while the internal processor is halted, authenticating firmware stored in the computer chip using the external controller and using a first digital signature of the firmware with a first key;
   unhalting the internal processor using the external controller after the authentication of the firmware is successful; and
   authenticating the firmware using the internal processor and using a second digital signature of the firmware with a second key.

2. The method of claim 1, further including receiving the firmware in the computer chip as an update and receiving, at the external controller, the first key used for authenticating the firmware.

3. The method of claim 1, wherein the first digital signature and the second digital signature are received with the firmware image.

4. The method of claim 1, wherein the second key is hardcoded into fuses in the computer chip.

5. The method of claim 1, wherein the authenticating the firmware using the external controller includes comparing a portion of the firmware stored in the computer chip to a portion of the firmware stored by the external controller.

6. A method, comprising:
   during an initialization of an Integrated Circuit (IC), pausing a processor within the IC using a controller;
   authenticating firmware within the IC using a first authentication performed by the controller; and
   if the first authentication of the firmware is successful, releasing the pause by the controller to resume initialization of the IC, and authenticating the firmware using a second authentication performed by the processor after the pause is released.

7. The method of claim 6, wherein the firmware includes first and second signatures signed with first and second keys, respectively, wherein the first authentication includes verifying the first signature using a key stored in hardware fuses within the IC and verifying the second signature using an updatable key stored in the controller.

8. The method of claim 6, wherein the second authentication is performed using a key stored within trusted storage of the IC.

9. The method of claim 6, wherein the first authentication includes comparing a first portion of the firmware stored by the controller to a second portion of the firmware stored within the IC to determine whether the first and second portions match.

10. The method of claim 6, wherein the pausing includes storing a pause command within a register of the processor using the controller, wherein the register controls a state of the processor.

11. The method of claim 6, wherein the IC is within a server computer.

12. The method of claim 6, further including receiving updated firmware at the IC and receiving an updated key at the controller, wherein the updated key is used to authenticate the updated firmware.

13. A system, comprising:
   a System On Chip (SOC) including a processor and a memory for storing an updated version of a firmware; and
   a controller coupled to the SOC;
   wherein the controller is configured to pause the processor during initialization of the SOC to perform a first authentication of the updated version of the firmware stored within the SOC and to unpause the processor when the authentication is successful;
   wherein the SOC is configured to perform a second authentication of the updated version of the firmware, using the processor, through the use of a key stored in trusted storage of the SOC.

14. The system of claim 13, wherein the controller is configured to perform the first authentication by comparing a portion of the updated version of the firmware stored by the controller to a portion of the updated version of the firmware stored in the memory.

15. The system of claim 14, wherein the portion of the updated version of the firmware includes a header and version number.

16. The system of claim 13, wherein the updated version of the firmware includes two signatures, a first for the first authentication by the controller and a second for the second authentication by the processor.

17. The system of claim 13, wherein the SOC is within a server computer.

18. The system of claim 13, wherein the controller can update a register within the SOC to pause the processor.

* * * * *